March 17, 1931. R. S. BURDETTE 1,797,195
WHEEL
Filed May 15, 1928   2 Sheets-Sheet 1

Inventor
Richard S. Burdette.
By
Attorney

March 17, 1931.  R. S. BURDETTE  1,797,195
WHEEL
Filed May 15, 1928   2 Sheets-Sheet 2
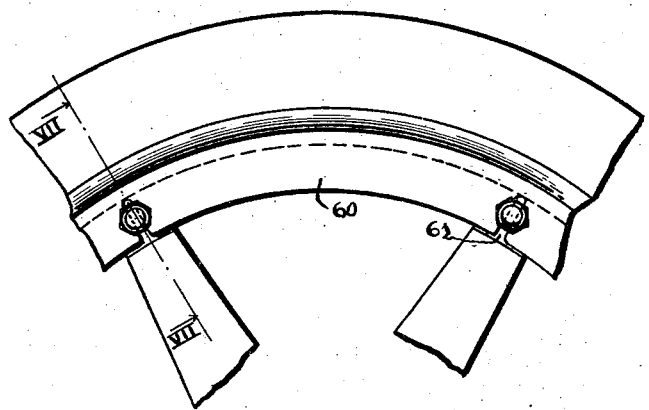
Fig. 6.
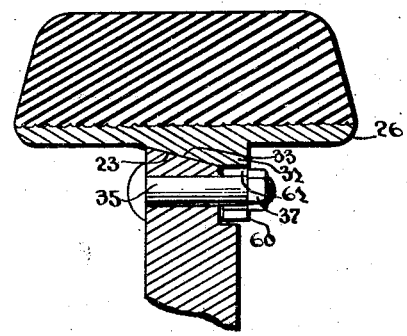
Fig. 7.
Fig. 8.
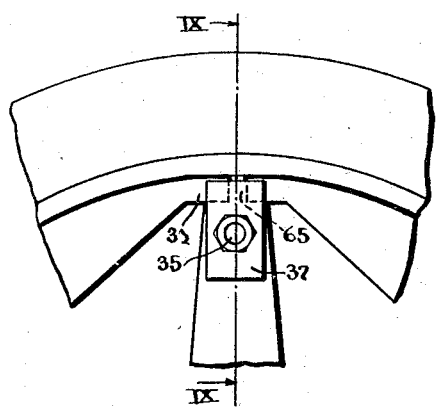
Fig. 9.
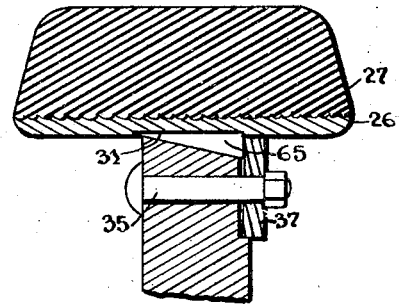
Inventor
Richard S. Burdette.
By
Attorney Patented Mar. 17, 1931

1,797,195

UNITED STATES PATENT OFFICE

RICHARD S. BURDETTE, OF AKRON, OHIO, ASSIGNOR TO THE GOODYEAR TIRE & RUBBER COMPANY, OF AKRON, OHIO, A CORPORATION OF OHIO

WHEEL

Application filed May 15, 1928. Serial No. 277,944.

My invention relates to vehicle wheels and it has particular relation to wheels of the above designated character, which are provided with demountable tire supporting members.

An object of the invention is to provide a wheel assembly in which an annular tire supporting rim is demountably secured upon the spokes of the wheel, and wherein the more flexible portions of the rim are disposed adjacent the ends of such spokes.

Heretofore, demountable rims have been employed by securing them directly upon the ends of the spokes of a wheel. These rims had laterally inclined portions at spaced intervals on their inner peripheries, which rested upon inclined surfaces on the ends of the spokes. Clamping devices for securing the rim upon the spokes, also were operable for moving the inclined surfaces of the rim over the inclined spoke ends. These rims either were of uniform strength throughout their length, or else had reinforced portions which rested upon the spoke ends. Consequently, the portions of the rim at the spokes were at least as rigid as the portions between the spokes. In fact, in the latter type of rim, the portions of the rim at the spoke ends were more rigid than the portions between the spokes. Consequently, it was difficult to distort the rim sufficiently to seat it properly upon the spokes.

In this embodiment of the invention, the rim, at spaced intervals corresponding in number to the spokes of the wheel, is provided with relatively flexible sections adapted to rest upon the spoke ends, between which the rim is materially reinforced. Consequently, the operation of the clamping means easily distorts the rim until it is seated properly upon the spokes.

For a better understanding of the invention, reference may now be had to the accompanying drawings, forming a part of this specification, of which:

Figure 6 is a fragmentary elevational view of a wheel, showing another form of the reinforced tire supporting rim;

Figure 7 is a cross-sectional view, taken substantially along the line VII—VII of Figure 6;

Figure 8 is a fragmentary elevational view of a wheel, showing still another form of the tire supporting rim; and Figure 9 is a cross-sectional view, taken substantially along the line IX—IX of Figure 8.

Figure 1:
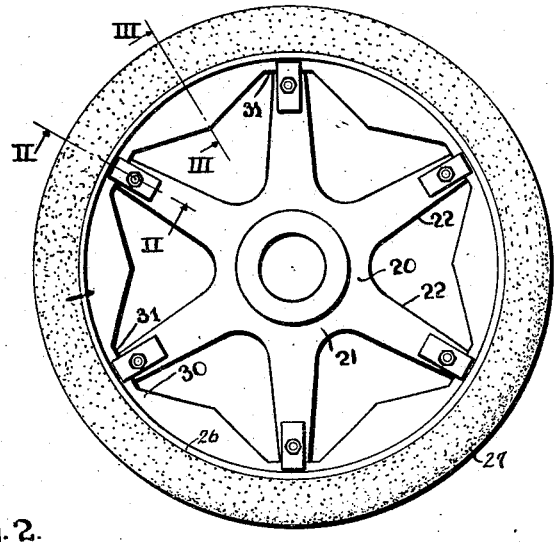
Figure 1 is an elevational view of a preferred form of the invention.

In practising the invention (Fig. 1), a wheel 20 is employed, which comprises a hub 21, having spokes 22 projecting radially therefrom. Each spoke at its outer end is inclined to the axis of the wheel (Figure 2) in order to provide a rim supporting surface 23. Adjacent this surface an opening 24 projects laterally through the spoke. In addition, each spoke has a ledge 25, disposed inwardly with respect to the opening 24 which extends transversely thereacross, and parallel to the plane of the rim. An annular rim 26, having a tire 27 thereon, is supported directly upon the inclined surfaces 23.

As best shown by Figure 1, the inner periphery of the rim 26 is provided with a flange 30, on the inner periphery of which spaced rim supporting sections 31 are formed. Each of the sections is composed of an inclined surface 32 and a radial surface 33 disposed between the diverging edge of the former and the rim. Between the sections 31, the flange 30 progressively increases in depth, in order to provide reinforced portions for resisting bending stresses effecting these portions of the rim.

The rim 26 is secured upon the ends of the spokes by fastening devices 34, comprising bolts 35 passing through the apertures 24 and having threaded end portions 36 for receiving clamps 37 having an opening 38 therein. One of the ends of the clamps abuts the ledge 25 and the other end engages the surface 33 on the rim 26. Nuts 39 for engaging the threaded ends of the bolts 35 urge the clamps 37 inwardly against the spokes 22 and the surfaces 33.

In the operation of the aforesaid construction, the rim 26 is disposed approximately in its proper position upon the ends of the spokes 22. The clamps 37 then are mounted upon the bolts 35, with their inner ends engaging the ledges 25 and their outer ends engaging the surfaces 33. Thereafter, the nuts 39 are engaged with the bolts 35. When the nuts are tightened against the clamps 37, the inclined surfaces 32 on the rim 26 will be moved relative to the inclined surfaces 23 on the ends of the spokes 22. As each nut is tightened, the rim adjacent thereto is moved outwardly, which results in the contraction thereof elsewhere. Contraction of the rim at any spoke end is limited by the clamp 37 abutting at opposite ends, the ledge 25 and the rim. For example, if one spoke should be slightly longer than another, by tightening the nut at the longer spoke the rim will be drawn into contact with the shorter spoke. By adjusting the nuts properly, the rim is seated upon the spokes approximately in concentric relation to the wheel, and in alignment therewith.

Figure 4:
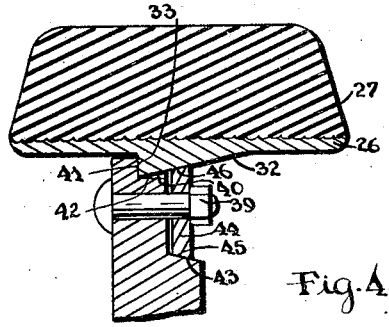
Figure 4 is a cross-sectional view of a form of the invention in which the tire supporting rim is mounted on the spokes of the wheel in a position the reverse of that shown by Figure 2.

In the construction shown by Figure 4, each spoke has a notch 40, defined by a radial surface 41 and a surface 42 parallel to the axis of the wheel. In addition, the spoke has a ledge 43 disposed in a position similar to that of the ledge 25 of Figure 2, but inclined with respect to the plane of the wheel. The opposite ends of clamps 44 operatively engaging the spokes 22, taper outwardly, as indicated at 45 and 46, respectively.

Figure 2:
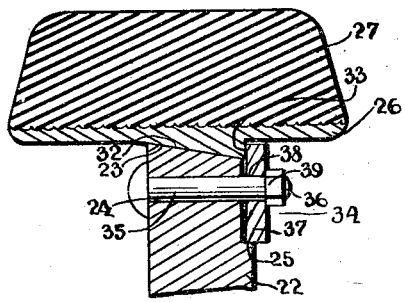
Figure 2 is a cross-sectional view, on a larger scale, taken substantially along the line II—II of Figure 1.
Figure 3:
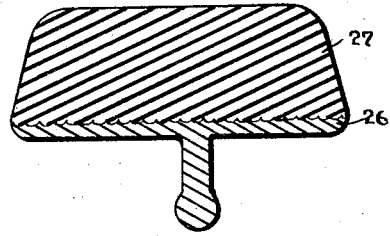
Figure 3 is a cross-sectional view, on a larger scale, taken substantially along the line III—III of Figure 1.

The rim is disposed upon the spokes in a reverse position, as compared with that shown by Figure 2, with the surface 33 thereof abutting the surface 41. By tightening the nuts 39, the inclined ends 46 of the clamps are moved relative to the inclined surfaces 32 of the rim 26, thus securing the rim rigidly in position.

Figure 5:
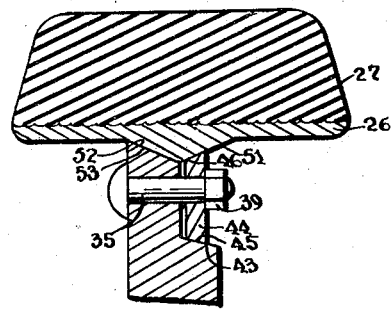
Figure 5 is a cross-sectional view of another form of the invention, in which the tire supporting rim has a plurality of inclined surfaces adjacent the ends of the spokes.

According to the construction shown by Figure 5, the flexible portions 31 of the flange 30, are provided with oppositely inclined seating surfaces 51 and 52. Each of the spokes is provided with an inclined surface 53, upon which the inclined surface 52 of the rim is seated. The ledges 43 and the clamps 44 are identical with those shown by Figure 4. When the nuts 39 are tightened, the clamps 44 move the inclined surfaces 52 and 53 relatively, until the rim is rigidly seated upon the spokes.

In the embodiment of the invention shown by Figures 6 and 7, the rim 26 is provided with a peripheral flange 60 projecting from the inner edge of the inclined surface 33. At spaced intervals corresponding to the number of spokes, the flange is slotted, as indicated at 61, and consequently the rim is relatively flexible in this region. The slots are substantially larger than the bolts 35, thus receiving the latter loosely. When the nuts 39 are tightened, the surface 33 is moved with respect to the surface 23, thus expanding the flexible portions of the rim until the latter is secured in its proper position.

The construction shown by Figures 8 and 9 is identical with that shown by Figure 2, except that the flexible sections 31 of the rim are provided with laterally extending slots 65. The purpose of these slots is further to increase the flexibility of the rim.

From the foregoing description, it is apparent that a tire supporting rim embodying the cardinal features of this invention is positively seated upon all of the spokes, notwithstanding any variation in the lengths thereof or variation in curvature of the rim. Moreover, the assembly is extremely and highly resistant to road shocks and other stresses to which such wheels are subjected.

Although I have illustrated only the preferred forms which the invention may assume and have described those forms in detail, it will be apparent to those skilled in the art that it is not so limited, but that various minor modifications may be made therein without departing from the spirit of the invention or from the scope of the appended claims.

What I claim is:

1. In combination, a wheel having circumferentially spaced supporting surfaces, a rim having seating surfaces mounted on said supporting surfaces, adjustable means for securing the rim upon the supporting surfaces by moving the rims radially outwardly adjacent such surfaces, said rim having radially disposed flanges extending inwardly, between the seating surfaces and laterally directed slots is such seating surfaces.

2. In combination, a wheel having circumferentially spaced supporting surfaces, a rim having seating surfaces mounted on said supporting surfaces, adjustable means for securing the rim upon the supporting surfaces by moving the rim radially outwardly adjacent such surfaces, said rim having radially disposed flanges extending inwardly, between the seating surfaces, said flanges being deepest midway between the seating surfaces and progressively of less depth as they approach the seating surfaces.

3. In combination, a wheel having circumferentially spaced supporting surfaces, a rim having seating surfaces mounted on said supporting surfaces, adjustable means for securing the rim upon the supporting surfaces by moving the rim radially outwardly adjacent such surfaces, said rim having radially disposed flanges extending inwardly between the seating surfaces, the flanges being deepest midway between the seating surfaces and progressively of less depth as they approach the seating surfaces, respectively, said seating surfaces on the rim having laterally directed slots therein.

In witness whereof, I have hereunto signed my name.

Signed at Akron, in the county of Summit and State of Ohio, this 8th day of May, 1928.

RICHARD S. BURDETTE.